(12) United States Patent
    Rivolta et al.

(10) Patent No.: US 12,326,984 B2
(45) Date of Patent: Jun. 10, 2025

(54) DEVICE PICK-UP DETECTION

(71) Applicant: STMICROELECTRONICS S.R.L., Agrate Brianza (IT)

(72) Inventors: Stefano Paolo Rivolta, Desio (IT); Roberto Mura, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 426 days.

(21) Appl. No.: 17/882,206

(22) Filed: Aug. 5, 2022

(65) Prior Publication Data

US 2024/0045514 A1    Feb. 8, 2024

(51) Int. Cl.
    *G06F 3/0346* (2013.01)
    *G01P 15/18* (2013.01)
    *G06F 1/16* (2006.01)
    *G06F 1/3206* (2019.01)

(52) U.S. Cl.
    CPC ............ *G06F 3/0346* (2013.01); *G01P 15/18* (2013.01); *G06F 1/1618* (2013.01); *G06F 1/1677* (2013.01); *G06F 1/3206* (2013.01)

(58) Field of Classification Search
    USPC ........................................................ 702/141
    See application file for complete search history.

(56) References Cited

U.S. PATENT DOCUMENTS

| 5,949,408 | A | 9/1999 | Kang et al. |
| 10,254,960 | B2* | 4/2019 | Zhao ................... G06F 1/1618 |
| 10,945,087 | B2 | 3/2021 | Yu et al. |
| 10,963,217 | B2 | 3/2021 | Smith et al. |
| 2009/0303205 | A1* | 12/2009 | Seibert ................. G06F 1/1677 |
| | | | 713/320 |
| 2010/0321275 | A1 | 12/2010 | Hinckley et al. |
| 2013/0212416 | A1 | 8/2013 | Crisan |
| 2013/0235083 | A1 | 9/2013 | Bao et al. |
| 2015/0221278 | A1 | 8/2015 | Le Grand et al. |
| 2016/0179137 | A1 | 6/2016 | Bendiscioli et al. |
| 2017/0168631 | A1 | 6/2017 | Roberts-Hoffman |
| 2020/0371734 | A1 | 11/2020 | Kawano et al. |
| 2021/0191491 | A1* | 6/2021 | Thong ................... G06F 1/3206 |
| 2021/0255686 | A1 | 8/2021 | Rivolta et al. |

FOREIGN PATENT DOCUMENTS

JP          6982649 B2    12/2021
WO    WO 2018080431 A1    5/2018

* cited by examiner

*Primary Examiner* — Paul D Lee
(74) *Attorney, Agent, or Firm* — SEED IP LAW GROUP LLP (57) ABSTRACT

The present disclosure is directed to pick-up state detection for an electronic device, such as a laptop. In a pick-up state, the device is picked or lifted up from a surface, such as a table. A power state of the device is adjusted in response to detecting the pick-up state. For example, the device is in a hibernate state while set on the table, and is switched to a working state in response to detecting the pick-up state.

27 Claims, 5 Drawing Sheets

DEVICE PICK-UP DETECTION

BACKGROUND

Technical Field

The present disclosure is directed to devices and methods for detecting whether an electronic device is being picked or lifted up by a user.

Description of the Related Art

Many electronic devices support a comprehensive and system-wide set of power management features to improve user experience, extend battery duration, save energy, and reduce heat and noise of the device. Power management features are particularly important for portable devices, such as laptop computers, foldable devices, tablets, and mobile devices, due to their limited power supply.

Power management features typically include options to transition the device between several different power states. For example, many devices support intermediate power states that are between an off state (e.g., the device is completely shut down and consumes no power) and an on state (e.g., the device is powered on and ready to be used by a user). Intermediate power states may include a sleep state in which the device is in a reduced power, idle state; and a hibernate state that is similar to the sleep state but consumes even less power. Intermediate power states allow a device to quickly return to an on state when the device is ready to be used by a user.

Many devices utilize device context recognition to customize transitions between power states. A device context algorithm may detect several different activities, such as whether a device is closed (e.g., the monitor of a laptop is folded onto the keyboard) or opened (e.g., the monitor of a laptop is positioned away from the keyboard). A device may then transition between power states based on the detected activity. For example, a laptop computer may switch from an on state to a sleep state in response to detecting that the laptop computer is closed, and switch from a hibernate or sleep state to an on state in response to detecting that the laptop computer is opened to be used by a user.

BRIEF SUMMARY

The present disclosure is directed to pick-up state detection for an electronic device, such as a laptop. In a pick-up state, the device is picked or lifted up from a surface, such as a table. A power state of the device is adjusted in response to detecting the pick-up state. For example, the device is in a hibernate state while set on the table, and is switched to a working state in response to detecting the pick-up state.

The device is configured to switch between several different operation modes, such as a clamshell mode, a closed mode, a tablet mode, a tent mode, and a stand mode. The pick-up state detection concurrently executes a first algorithm that is configured to detect a pick-up state while the laptop is in, for example, the closed mode or tablet mode; and a second algorithm that is configured to detect a pick-up state while the laptop is in, for example, the clamshell mode, the tent mode, or the stand mode.

The first algorithm detects a pick-up state in response to detecting the device is in a stationary condition, subsequently detecting the device is in a flat orientation, and subsequently detecting the device is in a non-flat orientation.

The second algorithm detects a pick-up state in response to detecting the device is in a stationary condition, subsequently detecting the device is in a horizontal orientation, subsequently detecting the device undergoes high motion, subsequently detecting the device is in the horizontal orientation again, and subsequently detecting the device is opened.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing foldable devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, many devices allow a manufacturer or user to customize transitions between power states of the device using device context recognition. It is desirable for device manufacturers to allow further customization of power state transitions by detecting additional activities or events for triggering the power state transitions. Activities that do not require direct interaction from the user are particularly desirable because the device does not have to rely on a user's action (e.g., pressing a power button, opening a laptop computer, closing a laptop computer, etc.). Rather, the device may preemptively trigger a power state transition for the user. As a result, user experience, battery duration, energy conservation, and heat and noise of a device may be improved.

The present disclosure is directed to a device that detects a pick-up state in which the device is picked or lifted up by a user. During a pick-up state, the device is, for example, currently being lifted from a stationary state on a table and moved to a different location. The device subsequently transitions between power states in response to detecting the pick-up state.

Figure 1:
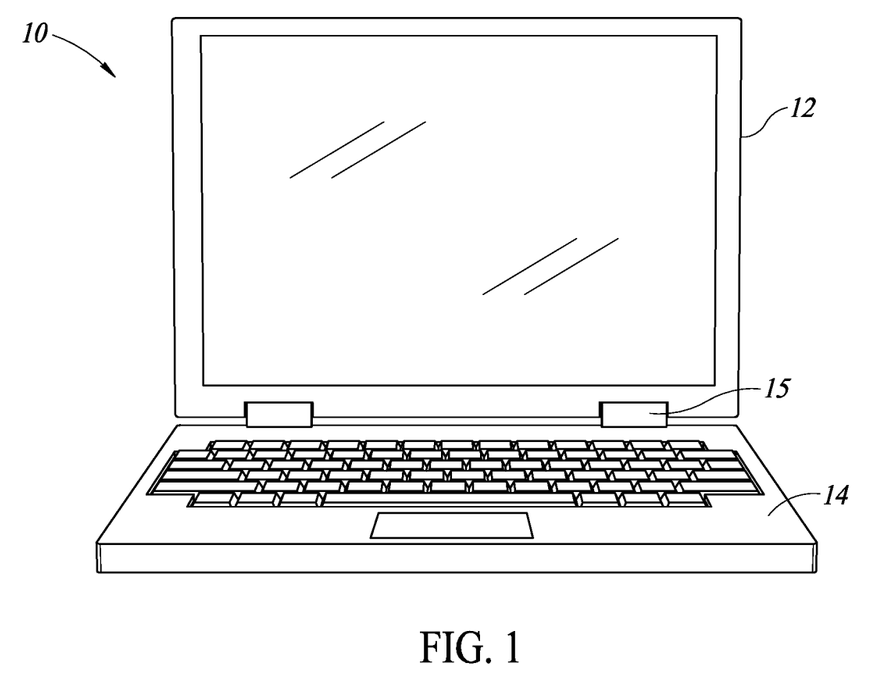
FIG. 1 is a device in a clamshell mode according to an embodiment disclosed herein.

FIG. 1 is a device 10 in a clamshell mode according to an embodiment disclosed herein. The device 10 is an electronic device that is configured to detect whether the device 10 is being picked or lifted up by a user. In this embodiment, the device 10 is a laptop computer including an upper lid or portion 12 and a lower lid or portion 14 coupled to the upper lid 12.

The upper lid 12 is a first portion (e.g., a first housing, or a first portion of a single housing) of the device 10 that includes one or more first components, and the lower lid 14 is a second portion (e.g., a second housing, or as second portion of the singe housing) of the device 10 that includes one or more second components. In the embodiment shown in FIG. 1, the upper lid 12 includes a monitor, such as a touch screen monitor. As will be discussed in further detail below, an accelerometer is also included in the upper lid 12. The lower lid 14 includes user inputs. For example, as shown in FIG. 1, the lower lid 14 includes a keyboard and a track pad. Other configurations are also possible. For example, each of the upper lid 12 and the lower lid 14 may include a touch screen monitor, or the lower lid 14 may include a touch screen monitor along with the user inputs.

The device 10 is a foldable laptop computer that is configured to fold in to a plurality of different operation modes. Stated differently, the upper lid 12 and the lower lid 14 may be rotated around hinges or a folding portion 15 into multiple different positions, and a user may operate the device 10 in a plurality of different ways. The angle between the monitor of the upper lid 12 and the user inputs of the lower lid 14 relative to the hinge 15 is often referred to as a lid angle.

Hinges are shown in FIG. 1. However, the upper lid 12 and the lower lid 14 may also be a single, continuous body that folds or bends onto each other. In this case, the device 10 does not include hinges, and the upper lid 12 and the lower lid 14 fold about a folding portion.

Several different operation modes are shown in FIGS. 1 to 5. Other operation modes are also possible.

In FIG. 1, the device 10 is in a clamshell mode. In the clamshell mode, the upper lid portion 12 is positioned in an upright position such that the monitor faces a user in front of the device 10. The lower lid 14 is positioned horizontally on a surface, such as a table, with the user inputs facing upward. The lid angle is typically between 75 and 125 degrees in the clamshell mode. The device 10 is utilized as a traditional laptop computer in the clamshell mode.

Figure 2:
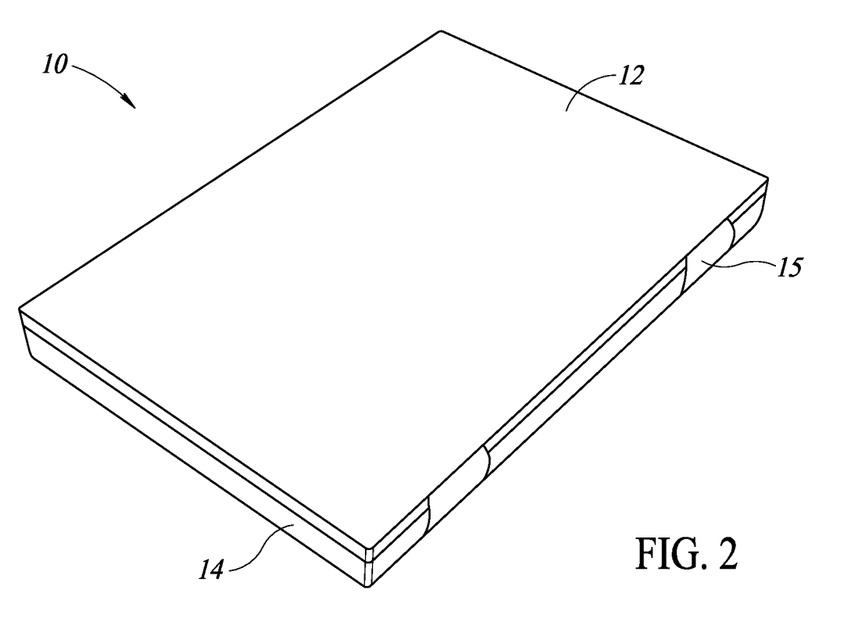
FIG. 2 is a device in a closed mode according to an embodiment disclosed herein.

FIG. 2 is the device 10 in a closed mode according to an embodiment disclosed herein. In the closed mode, the upper lid 12 is folded onto the lower lid 14 such that the monitor of the upper lid 12 and the user inputs of the lower lid 14 face each other. The lid angle is typically considered to be zero degrees in the closed mode. The device 10 is typically in transport and/or unused by the user in the closed mode.

Figure 3:
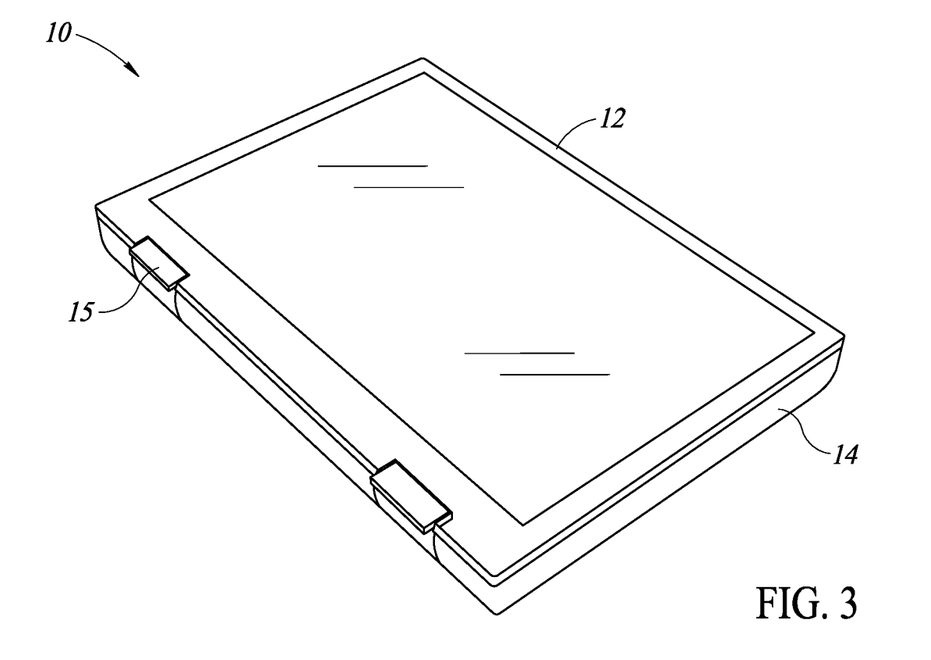
FIG. 3 is a device in a tablet mode according to an embodiment disclosed herein.

FIG. 3 is the device 10 in a tablet mode according to an embodiment disclosed herein. In the tablet mode, upper lid 12 is folded onto the lower lid 14. However, in contrast to the closed mode shown in FIG. 2, the monitor of the upper lid 12 and the user inputs of the lower lid 14 face in opposite directions. The lid angle is typically considered to be 360 degrees in the tablet mode. The device 10 is used as a table device in the tablet mode. For example, a user utilizes the monitor of the upper lid 12 as a touch screen, but does not use any of the user inputs of the lower lid 14.

Figure 4:
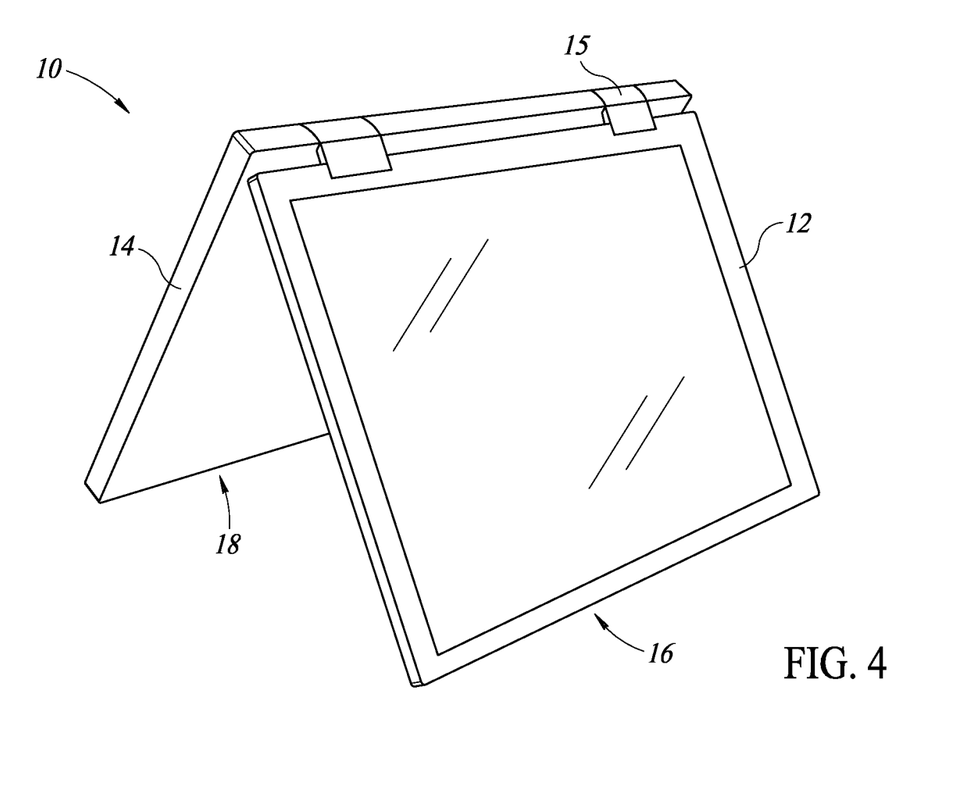
FIG. 4 is a device in a tent mode according to an embodiment disclosed herein.

FIG. 4 is the device 10 in a tent mode according to an embodiment disclosed herein. In the tent mode, the device 10 is positioned as an A-frame with the monitor of the upper lid 12 and the user inputs of the lower lid 14 facing in opposite directions. The lid angle is typically between 250 and 300 degrees in the tent mode. Similar to the tablet mode shown in FIG. 3, the device 10 is used as a table device in the tent mode. However, in contrast to the tablet mode, the upper lid 12 and the lower lid 14 are spaced from each other, and a horizontal edge 16 of the upper lid 12 and a horizontal edge 18 of the lower lid 14 are in contact with a surface, such as a table.

Figure 5:
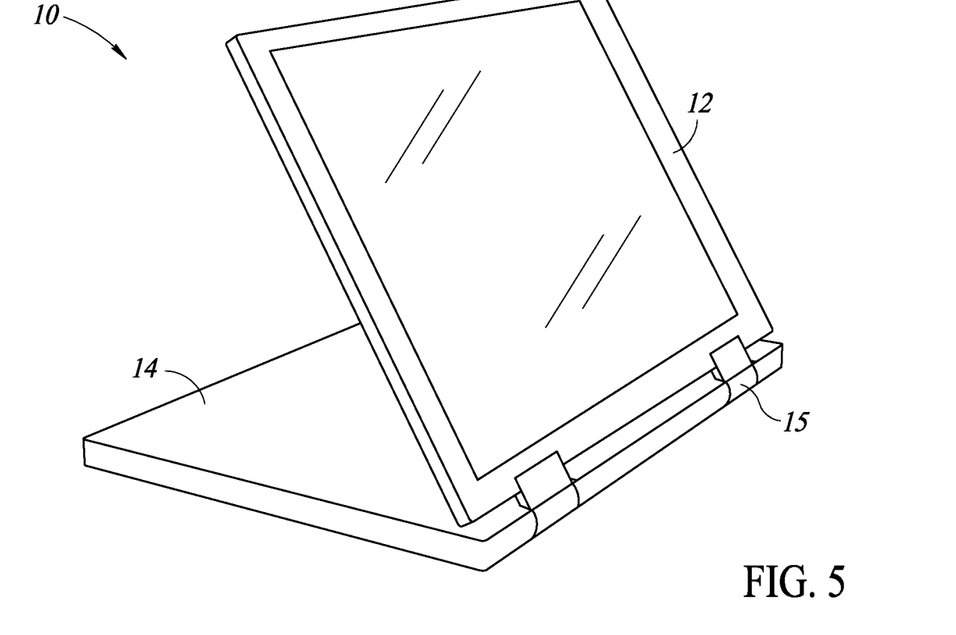
FIG. 5 is a device in a stand mode according to an embodiment disclosed herein.

FIG. 5 is a device 10 in a stand mode according to an embodiment disclosed herein. In the stand mode, similar to the tent mode, the device 10 is positioned as an A-frame, and the lid angle is typically between 250 and 300 degrees in the stand mode. Further, the device 10 is used as a table device in the stand mode. However, in contrast to the tent mode, the user inputs of the lower lid 14 is in contact with a surface, such as a table.

In the embodiment shown in FIGS. 1 to 5, the device 10 is a laptop computer. However, the device 10 may be any type of foldable electronic device configured to fold in to a plurality of different operation modes, such as a foldable tablet, mobile phone, or another type of mobile device.

Figure 6:
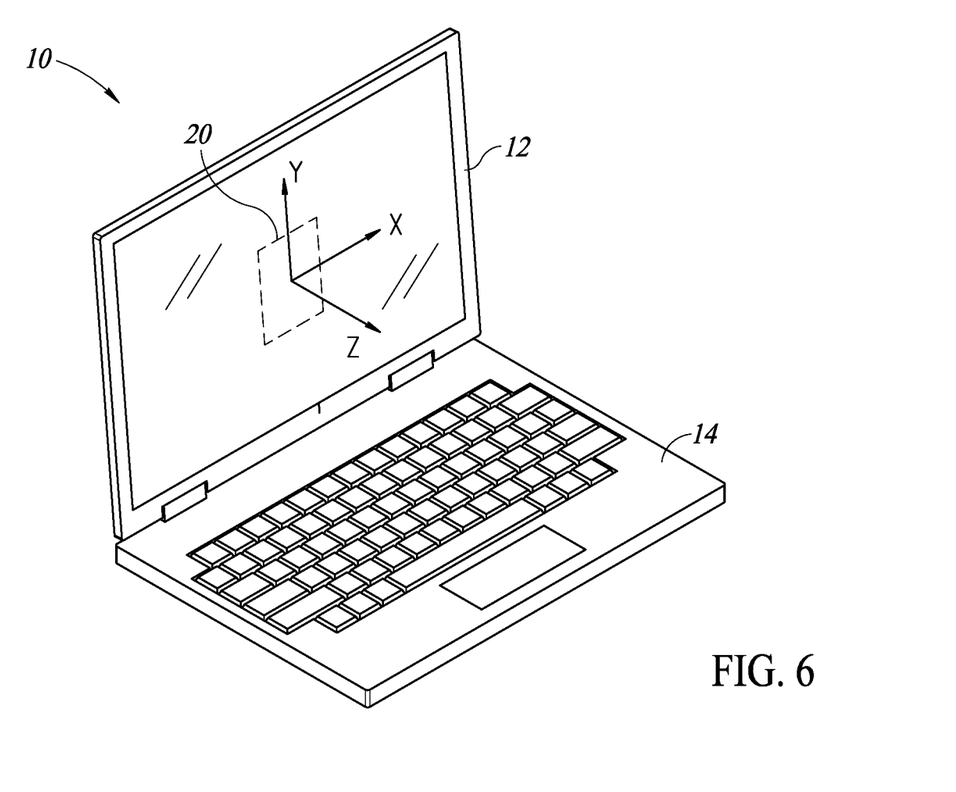
FIG. 6 is a device with an accelerometer according to an embodiment disclosed herein.

The device 10 includes an accelerometer to measure acceleration of the device 10. FIG. 6 is the device with an accelerometer 20 according to an embodiment disclosed herein.

The accelerometer 20 is included in the upper lid 12. As such, the accelerometer 20 measures movement, more specifically, acceleration of the upper lid 12.

The accelerometer 20 is a 3-axis accelerometer that measures acceleration along the x-axis, y-axis, and the z-axis shown in FIG. 6. The x-axis extends in a horizontal direction and in the same plane as a plane including the upper lid 12. The y-axis is transverse to the x-axis, and extends in a vertical direction and in the same plane as the plane including the upper lid 12. The z-axis is transverse to the x-axis and the y-axis, and extends in a horizontal direction and in a plane transverse to the plane including the upper lid 12.

The various embodiments described will be discussed with respect to the axes shown in FIG. 6. However, other orientations of the axes are also possible.

In one embodiment, the accelerometer 20 is included in a multi-sensor device that includes one or more types of sensors including, but not limited to, the accelerometer 20 and a gyroscope.

The multi-sensor device also includes its own onboard memory and processor. The processor is configured to process data generated by the sensors; and execute simple programs, such as finite state machines and decision tree logic.

In contrast to a general-purpose processor of the device 10, the multi-sensor device is a power-efficient, low-powered device that consumes between, for example, 5 and 10 microamps during processing. As such, the multi-sensor device, including the accelerometer 20, is able to remain on after the device 10 enters a sleep state. In the sleep state, the general-purpose processor and other electronic components (e.g., speakers, sensors, processors) of the device 10 are set to a low-powered or off state. The device 10 enters the sleep state, for example, in response to a determined amount of time of inactivity elapsing, or entering the closed mode discussed with respect to FIG. 2.

The device 10 is configured to detect a pick-up state of the device 10. In the pick-up state, the device 10 is being picked or lifted up by a user from, for example, a table. The device 10 detects the pick-up state based on a lid status of the device 10, an operation mode of the device 10, and an orientation of the device 10.

The lid status of the device 10 refers to whether the upper lid 12 and the lower lid 14 of the device 10 are closed or opened. The upper lid 12 and the lower lid 14 are closed when the device 10 is in the closed mode as discussed with respect to FIG. 2. The upper lid 12 and the lower lid 14 are opened when the device is not in the closed mode. For example, the device 10 is in the clamshell mode, the tablet mode, the tent mode, or the stand mode as discussed above with respect to FIGS. 1, 3, 4, and 5, respectively.

The operation mode of the device 10 refers to one of the modes discussed above with respect to FIGS. 1 to 5: the clamshell mode, closed mode, the tablet mode, the tent mode, or the stand mode.

The orientation of the device 10 refers to a position of the device 10. In order to detect the pick-up state, the device 10 determines whether the device 10 is in a vertical orientation, a horizontal orientation, a flat orientation, and a non-flat orientation. Referring to the axes shown in FIG. 6, the x-axis of the device 10 is parallel to gravity in the vertical orientation, the y-axis of the device 10 is parallel to gravity in the horizontal orientation, and the z-axis of the device 10 is parallel to gravity in the flat orientation. In the non-flat orientation, the device 10 does not have a flat orientation. For example, the device 10 is in the vertical orientation, the horizontal orientation, or another orientation besides the flat orientation.

The device 10 applies two different algorithms to the lid status, the operation mode, and the orientation of the device 10 to detect the pick-up state. A first algorithm, which will be discussed with respect to FIG. 7, detects the pick-up state in a case where the upper lid 12 and the lower lid 14 of the device 10 are in contact with each other (e.g., closed). A second algorithm, which will be discussed with respect to FIG. 8, detects the pick-up state in a case where the upper lid 12 and the lower lid 14 of the device 10 are spaced from each other (e.g., opened). In one embodiment, the first and second algorithms are performed by the device 10 concurrently so that the pick-up state may be detected regardless of the positions of the upper lid 12 and the lower lid 14. In another embodiment, one of the first and second algorithms are performed at a time based on the operation mode of the device 10. For example, the first algorithm is performed in response to detecting the device 10 is in the closed mode shown in FIG. 2 or the tablet mode shown in FIG. 3; and the second algorithm is performed in response to detecting the device 10 is in the clamshell mode shown in FIG. 1, the tent mode shown in FIG. 4, or the stand mode shown in FIG. 5.

Figure 7:
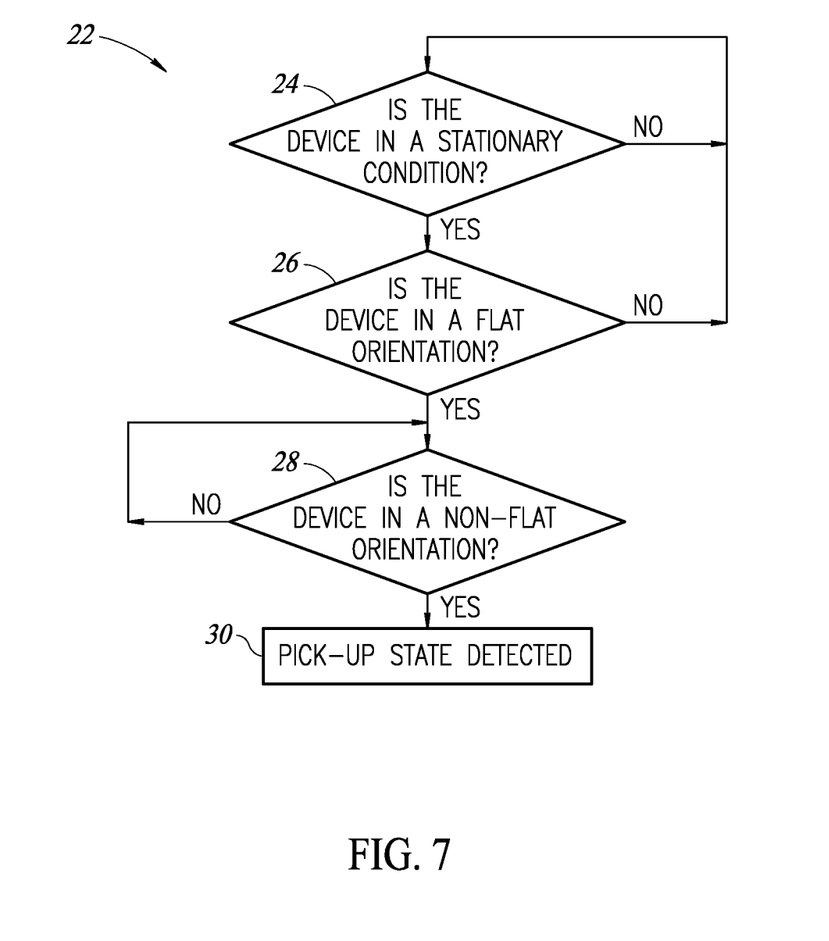
FIG. 7 is a first method to detect a pick-up state according to an embodiment disclosed herein.

FIG. 7 is a first method 22 to detect the pick-up state according to an embodiment disclosed herein. The first method 22 is configured to detect the pick-up state in a case where the upper lid 12 and the lower lid 14 of the device 10 are in contact with each other. Stated differently, a side of the upper lid 12 (e.g., the side including the monitor) is on or faces a side of the lower lid 14 (e.g., the side including the user inputs). For example, the device 10 is in the closed mode shown in FIG. 2 or the tablet mode shown in FIG. 3.

The first method 22 is executed by the device 10. In one embodiment, in a case where the accelerometer 20 is included in a multi-sensor device as discussed above, the first method 22 is performed by the processor included in the multi-sensor device. In one embodiment, the first method 22 is performed by a general-purpose processor of the device 10.

In block 24, the device 10 determines whether or not the device 10 is in a stationary condition. In the stationary condition, the device 10 remains still or steady for a determined amount of time. The detection of the stationary condition reduces false positives or false detections of the pick-up state. For example, detecting the stationary condition removes a case in which a user is carrying the device 10 while in a flat orientation.

The device 10 detects the stationary condition based on acceleration measured by the accelerometer 20. In one embodiment, the device 10 determines the device 10 is in the stationary condition in a case where a value of a norm $XL_V$ of the accelerations measured by the accelerometer 20 is less than a stationary threshold value $TH_{Stationary}$ for a stationary threshold amount of time (or a number of acceleration measurement samples) $T_{Stationary}$. Stated differently, the device 10 is in the stationary condition when the following condition (1) is satisfied:

$$XL_V < TH_{Stationary} \text{ for } T_{Stationary} \tag{1}$$

In a case where the accelerometer 20 is a 3-axis accelerometer as discussed with respect to FIG. 6, the norm $XL_V$ is calculated using the following equation (2):

$$XL_V = \sqrt{XL_x^2 + XL_y^2 + XL_z^2} \tag{2}$$

where $XL_x$, $XL_y$, and $XL_z$ are accelerations along the x-axis, y-axis, and z-axis, respectively, shown in FIG. 6.

In one embodiment, the stationary threshold value $TH_{Stationary}$ is between 1.1 and 1.2 g. In one embodiment, the stationary threshold amount of time $T_{Stationary}$ is between 50 and 75 seconds or between 50 and 100 acceleration measurement samples.

In one embodiment, the accelerations $XL_x$, $XL_y$, and $XL_z$ are filtered with a high pass filter prior to calculating the norm $XL_V$ in order to remove direct current (DC) components from the accelerations signals and improve accuracy. In this embodiment, the norm $XL_V$ is a norm of the high pass filtered accelerations $XL_x$, $XL_y$, and $XL_z$; and the stationary threshold value $TH_{Stationary}$ is between 0.01 and 0.05 g.

In a case where the stationary condition is undetected, the first method 22 returns to block 24 to continue to monitor for the stationary condition.

In a case where the stationary condition is detected, the first method 22 moves to block 26. In block 26, the device 10 determines whether or not the device 10 is in a flat orientation. As discussed above, referring to the axes shown in FIG. 6, the z-axis of the device 10 is parallel to gravity in the flat orientation.

The device 10 detects the flat orientation based on acceleration measured by the accelerometer 20. In one embodiment, referring to the axes shown in FIG. 6, the device 10 determines the device 10 is in the flat orientation in a case where an absolute value of the acceleration along the z-axis $XL_z$ measured by the accelerometer 20 is greater than a flat threshold value $TH_{Flat}$ for a flat threshold amount of time (or a number of acceleration measurement samples) $T_{Flat}$. Stated differently, the device 10 is in the flat orientation when the following condition (3) is satisfied:

$$abs(XL_z) > TH_{Flat} \text{ for } T_{Flat} \tag{3}$$

In one embodiment, the flat threshold value $TH_{Flat}$ is between 0.5 and 0.9 g. In one embodiment, the flat threshold amount of time $T_{Flat}$ is between 0.1 and 0.5 seconds or 1 acceleration measurement sample.

In one embodiment, the acceleration along the z-axis $XL_z$ is filtered with a low-pass filter prior to determining whether the condition (3) is satisfied in order to reduce potential linear acceleration (e.g., acceleration along the x-axis, y-axis, and z-axis in FIG. 6) applied to the accelerometer 20 while the device 10 is being picked up.

In a case where the device is not in the flat orientation, the first method 22 returns to block 24 to continue to monitor for the stationary condition again.

In a case where the device is in the flat orientation, the first method 22 moves to block 28. In block 28, the device 10 determines whether or not the device 10 is in a non-flat orientation. Stated differently, the device 10 determines whether the device 10 changes from the flat orientation determined in block 26 to another orientation. As discussed above, the device 10 is in the non-flat orientation when the device 10 is not in the flat orientation. For example, the device 10 is in the vertical orientation, the horizontal orientation, or another orientation besides the flat orientation.

The device 10 detects the non-flat orientation based on acceleration measured by the accelerometer 20. In one embodiment, referring to the axes shown in FIG. 6, the device 10 determines the device 10 is in the non-flat orientation in a case where an absolute value of the acceleration along the z-axis $XL_z$ measured by the accelerometer 20 is less than a non-flat threshold value $TH_{Non-Flat}$ for a non-flat threshold amount of time (or a number of acceleration measurement samples) $T_{Non-Flat}$. Stated differently, the device 10 is in the non-flat orientation when the following condition (4) is satisfied:

$$\text{abs}(XL_z) < TH_{Non-Flat} \text{ for } T_{Non-Flat} \quad (4)$$

In one embodiment, the non-flat threshold value $TH_{Non-Flat}$ is between 0.5 and 0.9 g. In one embodiment, the non-flat threshold amount of time $T_{Flat}$ is between 0.1 and 0.5 seconds or 1 acceleration measurement sample. In one embodiment, the non-flat threshold value $TH_{Non-Flat}$ is equal to the flat threshold value $TH_{Flat}$.

In one embodiment, the acceleration along the z-axis $XL_z$ is filtered with a low-pass filter prior to determining whether the condition (4) is satisfied in order to reduce potential linear acceleration (e.g., acceleration along the x-axis, y-axis, and z-axis in FIG. 6) applied to the accelerometer 20 while the device 10 is being picked up.

In a case where the device 10 is not in the non-flat orientation, the first method 22 loops to block 28 to continue to monitor for the non-flat orientation again.

In a case where the device 10 is in the non-flat orientation, the device 10 detects a pick-up state in block 30. As discussed above, in the pick-up state, the device 10 is being picked or lifted up by a user from, for example, a table. In response to detecting the pick-up state, the device 10, more specifically the multi-sensor device including the accelerometer 20 or the general-purpose processor, generates an interrupt to notify the system of the pick-up state.

A function of the device 10 is controlled based on the pick-up state in response to detecting the pick-up state. In one embodiment, a power state of the device is adjusted in response to detecting the pick-up state. The power state of the device 10 may include any type of low, normal, or high power state now known or later developed.

In one embodiment, the device 10 includes one or more of the following power states: a working state, a low power/standby state, a sleep state, a hibernate state, a soft off state, and a mechanical off state. In the working state, the device 10 is fully powered and ready to be used by a user. In the low power/standby state, the device 10 consumes less power than the working power state and is able to quickly switch to the working state. In the sleep state, the device 10 appears to be in an off state and consumes less power than the low power/standby state. In the hibernate state, the device 10 appears to be in an off state and consumes less power than the sleep state. In the soft off state, the device 10 appears to be in an off state and includes a full shutdown and reboot cycle. In the mechanical off state, the device 10 is in an off state and consumes no power.

In one embodiment, the device 10 is in one of the sleep state, the hibernate state, the soft off state, and the mechanical off state before detecting the pick-up state, and is switched to one of the working state and the low power/standby state in response to detecting the pick-up state.

Figure 8:
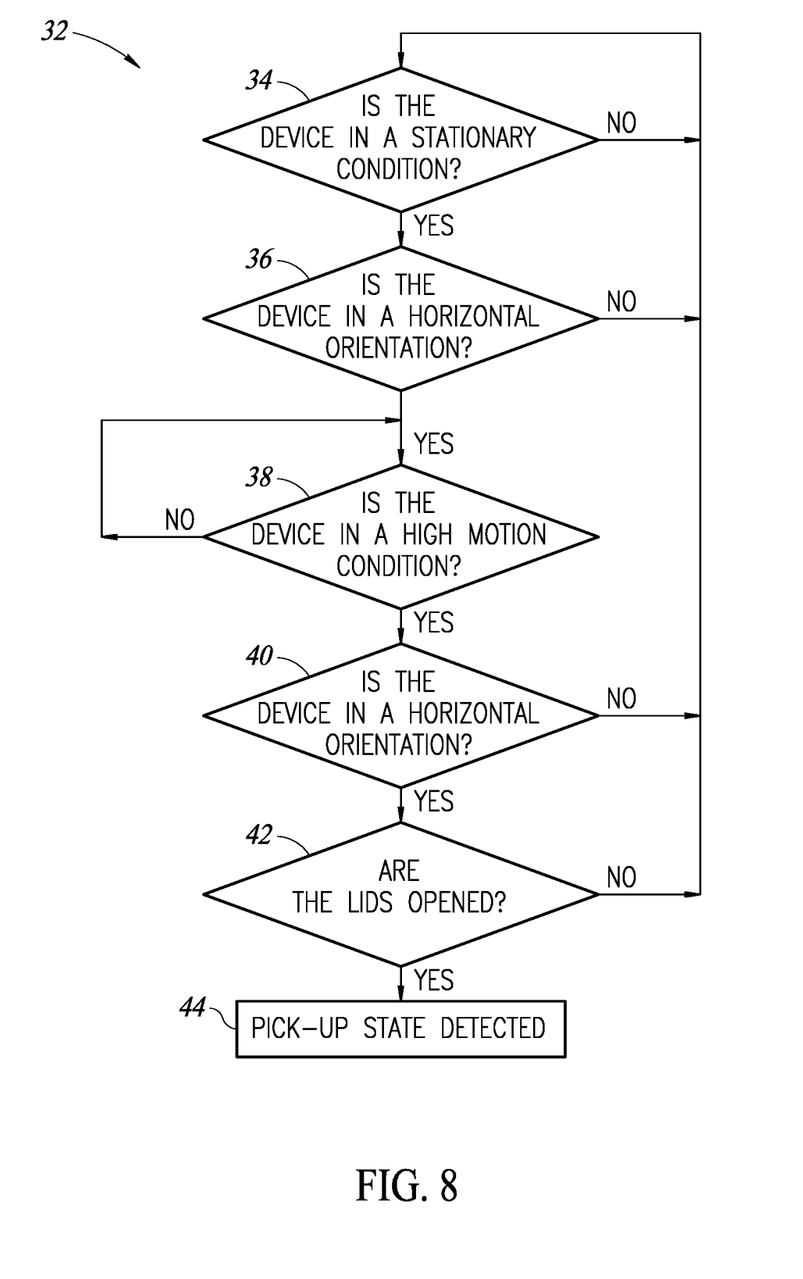
FIG. 8 is a second method to detect a pick-up state according to an embodiment disclosed herein.

FIG. 8 is a second method 32 to detect a pick-up state according to an embodiment disclosed herein. The second method 32 is configured to detect the pick-up state in a case where the upper lid 12 and the lower lid 14 of the device 10 are spaced from each other (e.g., opened). Stated differently, a side of the upper lid 12 (e.g., the side including the monitor) is spaced from a side of the lower lid 14 (e.g., the side including the user inputs). For example, the device 10 is in the clamshell mode shown in FIG. 1, the tent mode shown in FIG. 4, or the stand mode shown in FIG. 5.

The second method 32 is executed by the device 10. In one embodiment, in a case where the accelerometer 20 is included in a multi-sensor device as discussed above, the second method 32 is performed by the processor included in the multi-sensor device. In one embodiment, the second method 32 is performed by a general-purpose processor of the device 10.

In block 34, the device 10 determines whether or not the device 10 is in a stationary condition. As discussed above with respect to block 24 of FIG. 7, in the stationary condition, the device 10 remains still for a determined amount of time. The detection of the stationary condition reduces false positives or false detections of the pick-up state. For example, detecting the stationary condition removes a case in which a user is carrying the device 10 while in a horizontal orientation.

The same methods to determine the stationary condition as discussed with respect to block 24 are used in block 34, and are not repeated here.

In a case where the stationary condition is undetected, the second method 32 returns to block 34 to continue to monitor for the stationary condition.

In a case where the stationary condition is detected, the second method 32 moves to block 36. In block 36, the device 10 determines whether or not the device 10 is in a horizontal orientation. As discussed above, referring to the axes shown in FIG. 6, the y-axis of the device 10 is parallel to gravity in the horizontal orientation.

The device 10 detects the horizontal orientation based on acceleration measured by the accelerometer 20. In one embodiment, referring to the axes shown in FIG. 6, the device 10 determines the device 10 is in the horizontal orientation in a case where an absolute value of the acceleration along the y-axis $XL_y$ measured by the accelerometer 20 is greater than a horizontal threshold value $TH_{Horizontal}$ for a horizontal threshold amount of time (or a number of acceleration measurement samples) $T_{Horizontal}$. Stated differently, the device 10 is in the horizontal orientation when the following condition (5) is satisfied:

$$\text{abs}(XL_y) > TH_{Horizontal} \text{ for } T_{Horizontal} \quad (5)$$

In one embodiment, the horizontal threshold value $TH_{Horizontal}$ is between 0.5 and 0.9 g. In one embodiment, the flat threshold amount of time $T_{Horizontal}$ is between 0.1 and 0.5 seconds or 1 acceleration measurement sample.

In one embodiment, the acceleration along the y-axis $XL_y$ is filtered with a low-pass filter prior to determining whether the condition (5) is satisfied in order to reduce potential linear acceleration (e.g., acceleration along the x-axis, y-axis, and z-axis in FIG. 6) applied to the accelerometer 20 while the device 10 is being picked up.

In a case where the device 10 is not in the horizontal orientation, the second method 32 returns to block 34 to continue to monitor for the stationary condition again.

In a case where the device 10 is in the horizontal orientation, the second method 32 moves to block 38. In block 38, the device 10 determines whether or not the device 10 is in a high motion condition. In the high motion condition, the device 10 is currently undergoing motion. Stated differently, the device 10 is no longer in the stationary condition determined in block 34.

The device 10 detects the high motion condition based on acceleration measured by the accelerometer 20. In one embodiment, the device 10 determines the device 10 is in the high motion condition in a case where a value of a norm $XL_V$ of the accelerations measured by the accelerometer 20 is greater than a high motion threshold value $TH_{High\ Motion}$. Stated differently, the device 10 is in the high motion condition when the following condition (6) is satisfied:

$$XL_V > TH_{High\ Motion} \quad (6)$$

As discussed with respect to block 24 of FIG. 7, the norm $XL_V$ is calculated using equation (2) above. In one embodiment, the high motion threshold value $TH_{HighMotion}$ is between 1.1 and 1.2 g.

In one embodiment, the accelerations $XL_x$, $XL_y$, and $XL_z$ are filtered with a high pass filter prior to calculating the norm $XL_V$ in order to remove direct current (DC) components from the accelerations signals and improve accuracy. In this embodiment, the norm $XL_V$ is a norm of the high pass filtered accelerations $XL_x$, $XL_y$, and $XL_z$, and the high motion threshold value $TH_{HighMotion}$ is between 0.01 and 0.05 g.

In a case where the high motion condition is undetected, the second method 32 loops to block 38 to continue to monitor for the high motion condition again.

In a case where the high motion condition is detected, the second method 32 moves to block 40. In block 40, the device 10 determines whether or not the device 10 is in a horizontal orientation again after detecting the high motion condition in block 38.

The same methods to determine whether the device 10 is in the horizontal orientation as discussed with respect to block 36 are used in block 40, and are not repeated here.

In a case where the device 10 is not in the horizontal orientation again after detecting the high motion condition in block 38, the second method 32 returns to block 34 to continue to monitor for the stationary condition again.

In a case where the device 10 is in the horizontal orientation again after detecting the high motion condition in block 38, the second method 32 moves to block 42. In block 42, the device 10 determines whether or not the upper lid 12 and the lower lid 14 of the device 10 are opened to validate the operation mode of the device 10. The upper lid 12 and the lower lid 14 are opened when the upper lid 12 and the lower lid 14 of the device 10 are spaced from each other. Stated differently, a side of the upper lid 12 (e.g., the side including the monitor) is spaced from a side of the lower lid 14 (e.g., the side including the user inputs). For example, the device 10 determines the upper lid 12 and the lower lid 14 are opened in case where the device 10 is in the clamshell mode shown in FIG. 1, the tent mode shown in FIG. 4, or the stand mode shown in FIG. 5.

In one embodiment, the device 10 determines the upper lid 12 and the lower lid 14 of the device 10 are opened or closed using one or more proximity or distance sensors, such as time-of-flight sensors, that measure a distance between the upper lid 12 and the lower lid 14. For example, the device 10 determines the upper lid 12 and the lower lid 14 are opened in case where the distance between the upper lid 12 and the lower lid 14 is greater than a threshold value, and determines the upper lid 12 and the lower lid 14 are closed in case where the distance between the upper lid 12 and the lower lid 14 is less than the threshold value. Other methods, such as lid angle detection or hall sensors-based methods may also be used.

In a case where the upper lid 12 and the lower lid 14 are closed, the second method 32 returns to block 34 to continue to monitor for the stationary condition again.

In a case where the upper lid 12 and the lower lid 14 are opened, the device 10 detects a pick-up state in block 44. As discussed above, in the pick-up state, the device 10 is being picked or lifted up by a user from, for example, a table. In response to detecting the pick-up state, the device 10, more specifically the multi-sensor device including the accelerometer 20 or the general-purpose processor, generates an interrupt to notify the system of the pick-up state.

As discussed above, a function, such as a power state, of the device 10 is controlled based on the pick-up state in response to detecting the pick-up state. In one embodiment, the device 10 is in one of the sleep state, the hibernate state, the soft off state, and the mechanical off state before detecting the pick-up state, and is switched to one of the working state and the low power/standby state in response to detecting the pick-up state.

The various embodiments disclosed herein provide devices and methods for detecting a pick-up state in which the device is picked or lifted up by a user. The pick-up state is detected using various acceleration measurements, and may be detected regardless of whether the upper and lower lids of the device are closed or opened. The device transitions between power states in response to detecting the pick-up state.

A device may be summarized as including a first portion including an accelerometer configured to measure accelerations along a first axis, a second axis transverse to the first axis, and a third axis transverse to the first axis and the second axis; a second portion coupled to the first portion, the first portion configured to move in to a first position in which a side of the first portion faces a side of the second portion and in to a second position in which the side of the first portion is spaced from the side of the second portion; and a processor configured to detect a pick-up state in a case where the first portion is in the first position based on the accelerations along the first, second, and third axes, the device being lifted in the pick-up state; and detect the pick-up state in a case where the first portion is in the second position based on the accelerations along the first, second, and third axes.

The pick-up state may be detected using a first algorithm in the case where the first portion is in the first position, and the pick-up state may be detected using a second algorithm different from the first algorithm in the case where the first portion is in the second position.

In the case where the first portion is in the first position, the processor may detect the pick-up state in response to the device being in a stationary condition, a flat orientation, and a non-flat orientation.

The processor may determine the device is in the stationary condition in response to a norm of the accelerations along the first, second, and third axes being less than a threshold value for a determined amount of time.

The first axis and the second axis may extend along a surface of the first portion, the third axis may be transverse to the surface of the first portion, and the processor may determine the device is in the flat orientation in response to an absolute value of the acceleration along the third axis being greater than a threshold value for a determined amount of time.

The first axis and the second axis may extend along a surface of the first portion, the third axis may be transverse to the surface of the first portion, and the processor may determine the device is in the non-flat orientation in response to an absolute value of the acceleration along the third axis being less than a threshold value for a determined amount of time.

In the case where the first portion is in the second position, the processor may detect the pick-up state in response to the device being in a stationary condition, a horizontal orientation, and a high motion condition.

The processor may determine the device is in the stationary condition in response to a norm of the accelerations along the first, second, and third axes being less than a threshold value for a determined amount of time.

The first axis and the second axis may extend along a surface of the first portion, the third axis may be transverse to the surface of the first portion, and the processor may determine the device is in the horizontal orientation in response to an absolute value of the acceleration along the second axis being greater than a threshold value for a determined amount of time.

The processor may determine the device is in the high motion condition in response to a norm of the accelerations along the first, second, and third axes being greater than a threshold value.

The device may further include a multi-sensor in the first portion, the multi-sensor including the accelerometer and the processor.

The first portion may include a monitor, and the second portion may include a user inputs.

The first and second portions may be configured to move in to an operation mode of a plurality of operation modes including a clamshell mode, a closed mode, a tablet mode, a tent mode, and a stand mode.

A method may be summarized as including measuring, by an accelerometer of a device, accelerations along a first axis, a second axis transverse to the first axis, and a third axis transverse to the first axis and the second axis, the device including a first portion having the accelerometer and a second portion coupled to the first portion; detecting, by the device, a pick-up state in a case where the first portion is in a first position based on the accelerations along the first, second, and third axes, a side of the first portion facing a side of the second portion in the first position, the device being lifted in the pick-up state; and detecting, by the device, the pick-up state in a case where the first portion is in a second position based on the accelerations along the first, second, and third axes, the side of the first portion being spaced from the side of the second portion in the second position.

Detecting the pick-up state in the case where the first portion is in the first position may include performing a first algorithm, and detecting the pick-up state in the case where the first portion is in the second position may include performing a second algorithm different from the first algorithm.

The first algorithm may include detecting the device is in a stationary condition based on the accelerations along the first, second, and third axes; detecting, subsequent to detecting the device is in the stationary condition, the device is in a flat orientation based on the acceleration along the third axis; detecting, subsequent to detecting the device is in the flat orientation, the device is in a non-flat orientation based on the acceleration along the third axis; and detecting the pick-up state of the device in response to detecting the device is in the non-flat orientation.

The second algorithm may include detecting the device is in a stationary condition based on the accelerations along the first, second, and third axes; detecting, subsequent to detecting the device is in the stationary condition, the device is in a first horizontal orientation based on the acceleration along the second axis; detecting, subsequent to detecting the device is in the first horizontal orientation, the device is in a high motion condition based on the acceleration along the first, second, and third axes; detecting, subsequent to detecting the device is in the high motion condition, the device is in a second horizontal orientation based on the acceleration along the second axis; detecting, subsequent to detecting the device is in the second horizontal orientation, the first portion and the second portion of the device are opened; and detecting the pick-up state of the device in response to detecting the first portion and the second portion of the device are opened.

A method may be summarized as including measuring accelerations along a first axis, a second axis transverse to the first axis, and a third axis transverse to the first axis and the second axis; detecting a device is in a stationary condition based on the accelerations along the first, second, and third axes; detecting, subsequent to detecting the device is in the stationary condition, the device is in a flat orientation based on the acceleration along the third axis; detecting, subsequent to detecting the device is in the flat orientation, the device is in a non-flat orientation based on the acceleration along the third axis; and detecting a pick-up state of the device in response to detecting the device is in the non-flat orientation, the device being lifted in the pick-up state.

Detecting the device is in the stationary condition may include determining a norm of the accelerations along the first, second, and third axes is less than a threshold value for a determined amount of time.

Detecting the device is in the flat orientation may include determining an absolute value of the acceleration along the third axis is greater than a threshold value for a determined amount of time.

Detecting the device is in the non-flat orientation may include determining an absolute value of the acceleration along the third axis is less than a threshold value for a determined amount of time.

The method may further include detecting, subsequent to detecting the device is in the stationary condition, the device is in a first horizontal orientation based on the acceleration along the second axis; detecting, subsequent to detecting the device is in the first horizontal orientation, the device is in a high motion condition based on the acceleration along the first, second, and third axes; detecting, subsequent to detecting the device is in the high motion condition, the device is in a second horizontal orientation based on the acceleration along the second axis; and detecting the pick-up state of the device in response to detecting the device is in the second horizontal orientation.

The method may further include detecting, subsequent to detecting the device is in the second horizontal orientation, a first portion and a second portion of the device are opened; and detecting the pick-up state of the device in response to detecting the first portion and the second portion of the device are opened.

Each of detecting the device is in the first horizontal orientation and the second horizontal orientation may include determining an absolute value of the acceleration along the second axis is greater than a threshold value for a determined amount of time.

Detecting the device is in the high motion condition may include determining a norm of the accelerations along the first, second, and third axes is greater than a threshold value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first portion including an accelerometer configured to measure accelerations along a first axis, a second axis transverse to the first axis, and a third axis transverse to the first axis and the second axis;
a second portion coupled to the first portion, the first portion configured to move in to a first position in which a side of the first portion faces a side of the second portion and in to a second position in which the side of the first portion is spaced from the side of the second portion; and
a processor configured to:
detect a pick-up state in a case where the first portion is in the first position based on the accelerations along the first, second, and third axes, the device being lifted in the pick-up state; and
detect the pick-up state in a case where the first portion is in the second position based on the accelerations along the first, second, and third axes,
in the case where the first portion is in the first position, the processor detects the pick-up state in response to the device being in a stationary condition, a flat orientation, and a non-flat orientation.

2. The device of claim 1 wherein the pick-up state is detected using a first algorithm in the case where the first portion is in the first position, and the pick-up state is detected using a second algorithm different from the first algorithm in the case where the first portion is in the second position.

3. The device of claim 1 wherein the processor determines the device is in the stationary condition in response to a norm of the accelerations along the first, second, and third axes being less than a threshold value for a determined amount of time.

4. The device of claim 1 wherein
the first axis and the second axis extend along a surface of the first portion,
the third axis is transverse to the surface of the first portion, and
the processor determines the device is in the flat orientation in response to an absolute value of the acceleration along the third axis being greater than a threshold value for a determined amount of time.

5. The device of claim 1 wherein
the first axis and the second axis extend along a surface of the first portion,
the third axis is transverse to the surface of the first portion, and
the processor determines the device is in the non-flat orientation in response to an absolute value of the acceleration along the third axis being less than a threshold value for a determined amount of time.

6. The device of claim 1 wherein, in the case where the first portion is in the second position, the processor detects the pick-up state in response to the device being in the stationary condition, a horizontal orientation, and a high motion condition.

7. The device of claim 6 wherein the processor determines the device is in the stationary condition in response to a norm of the accelerations along the first, second, and third axes being less than a threshold value for a determined amount of time.

8. The device of claim 6 wherein
the first axis and the second axis extend along a surface of the first portion,
the third axis is transverse to the surface of the first portion, and
the processor determines the device is in the horizontal orientation in response to an absolute value of the acceleration along the second axis being greater than a threshold value for a determined amount of time.

9. The device of claim 6 wherein the processor determines the device is in the high motion condition in response to a norm of the accelerations along the first, second, and third axes being greater than a threshold value.

10. The device of claim 1, further comprising:
a multi-sensor in the first portion, the multi-sensor including the accelerometer and the processor.

11. The device of claim 1 wherein the first portion includes a monitor, and the second portion include a user inputs.

12. The device of claim 1 wherein the first and second portions are configured to move in to an operation mode of a plurality of operation modes including a clamshell mode, a closed mode, a tablet mode, a tent mode, and a stand mode.

13. A method, comprising:
measuring, by an accelerometer of a device, accelerations along a first axis, a second axis transverse to the first axis, and a third axis transverse to the first axis and the second axis, the device including a first portion having the accelerometer and a second portion coupled to the first portion;
in a case where the first portion is in a first position, detecting, by the device and by performing a first algorithm, a pick-up state based on the accelerations along the first, second, and third axes,
a side of the first portion facing a side of the second portion in the first position,
the device being lifted in the pick-up state; and
in a case where the first portion is in a second position, detecting, by the device and by performing a second algorithm different from the first algorithm, the pick-up state based on the accelerations along the first, second, and third axes,
the side of the first portion being spaced from the side of the second portion in the second position.

14. The method of claim 13 wherein the first algorithm includes:
  detecting the device is in a stationary condition based on the accelerations along the first, second, and third axes;
  detecting, subsequent to detecting the device is in the stationary condition, the device is in a flat orientation based on the acceleration along the third axis;
  detecting, subsequent to detecting the device is in the flat orientation, the device is in a non-flat orientation based on the acceleration along the third axis; and
  detecting the pick-up state of the device in response to detecting the device is in the non-flat orientation.

15. The method of claim 13 wherein the second algorithm includes:
  detecting the device is in a stationary condition based on the accelerations along the first, second, and third axes;
  detecting, subsequent to detecting the device is in the stationary condition, the device is in a first horizontal orientation based on the acceleration along the second axis;
  detecting, subsequent to detecting the device is in the first horizontal orientation, the device is in a high motion condition based on the acceleration along the first, second, and third axes;
  detecting, subsequent to detecting the device is in the high motion condition, the device is in a second horizontal orientation based on the acceleration along the second axis;
  detecting, subsequent to detecting the device is in the second horizontal orientation, the first portion and the second portion of the device are opened; and
  detecting the pick-up state of the device in response to detecting the first portion and the second portion of the device are opened.

16. A method, comprising:
  measuring accelerations along a first axis, a second axis transverse to the first axis, and a third axis transverse to the first axis and the second axis;
  detecting a device is in a stationary condition based on the accelerations along the first, second, and third axes;
  detecting, subsequent to detecting the device is in the stationary condition, the device is in a flat orientation based on the acceleration along the third axis;
  detecting, subsequent to detecting the device is in the flat orientation, the device is in a non-flat orientation based on the acceleration along the third axis; and
  detecting a pick-up state of the device in response to detecting the device is in the non-flat orientation, the device being lifted in the pick-up state.

17. The method of claim 16 wherein detecting the device is in the stationary condition includes determining a norm of the accelerations along the first, second, and third axes is less than a threshold value for a determined amount of time.

18. The method of claim 16 wherein detecting the device is in the flat orientation includes determining an absolute value of the acceleration along the third axis is greater than a threshold value for a determined amount of time.

19. The method of claim 16 wherein detecting the device is in the non-flat orientation includes determining an absolute value of the acceleration along the third axis is less than a threshold value for a determined amount of time.

20. The method of claim 16, further comprising:
  detecting, subsequent to detecting the device is in the stationary condition, the device is in a first horizontal orientation based on the acceleration along the second axis;
  detecting, subsequent to detecting the device is in the first horizontal orientation, the device is in a high motion condition based on the acceleration along the first, second, and third axes;
  detecting, subsequent to detecting the device is in the high motion condition, the device is in a second horizontal orientation based on the acceleration along the second axis; and
  detecting the pick-up state of the device in response to detecting the device is in the second horizontal orientation.

21. The method of claim 20, further comprising:
  detecting, subsequent to detecting the device is in the second horizontal orientation, a first portion and a second portion of the device are opened; and
  detecting the pick-up state of the device in response to detecting the first portion and the second portion of the device are opened.

22. The method of claim 20 wherein each of detecting the device is in the first horizontal orientation and the second horizontal orientation includes determining an absolute value of the acceleration along the second axis is greater than a threshold value for a determined amount of time.

23. The method of claim 20 wherein detecting the device is in the high motion condition includes determining a norm of the accelerations along the first, second, and third axes is greater than a threshold value.

24. A device, comprising:
  a first portion including an accelerometer configured to measure accelerations along a first axis, a second axis transverse to the first axis, and a third axis transverse to the first axis and the second axis;
  a second portion coupled to the first portion, the first portion configured to move in to a first position in which a side of the first portion faces a side of the second portion and in to a second position in which the side of the first portion is spaced from the side of the second portion; and
  a processor configured to:
    detect, using a first algorithm, a pick-up state in a case where the first portion is in the first position based on the accelerations along the first, second, and third axes, the device being lifted in the pick-up state; and
    detect, using a second algorithm different from the first algorithm, the pick-up state in a case where the first portion is in the second position based on the accelerations along the first, second, and third axes.

25. The device of claim 24 wherein
  in the case where the first portion is in the first position, the processor detects the pick-up state in response to the device being in a stationary condition, a flat orientation, and a non-flat orientation, and
  in the case where the first portion is in the second position, the processor detects the pick-up state in response to the device being in the stationary condition, a horizontal orientation, and a high motion condition.

26. A device, comprising:
  a first portion including an accelerometer configured to measure accelerations along a first axis, a second axis transverse to the first axis, and a third axis transverse to the first axis and the second axis;
  a second portion coupled to the first portion, the first portion configured to move in to a first position in which a side of the first portion faces a side of the second portion and in to a second position in which the side of the first portion is spaced from the side of the second portion; and a processor configured to:
- detect a pick-up state in a case where the first portion is in the first position based on the accelerations along the first, second, and third axes, the device being lifted in the pick-up state; and
- detect the pick-up state in a case where the first portion is in the second position based on the accelerations along the first, second, and third axes, in the case where the first portion is in the second position, the processor detects the pick-up state in response to the device being in a stationary condition, a horizontal orientation, and a high motion condition.

27. The device of claim 26 wherein the first axis and the second axis extend along a surface of the first portion, the third axis is transverse to the surface of the first portion, the processor determines the device is in the stationary condition in response to a norm of the accelerations along the first, second, and third axes being less than a first threshold value for a first determined amount of time, the processor determines the device is in the horizontal orientation in response to an absolute value of the acceleration along the second axis being greater than a second threshold value for a second determined amount of time, and the processor determines the device is in the high motion condition in response to a norm of the accelerations along the first, second, and third axes being greater than a third threshold value.

* * * * *